United States Patent [19]

Henry et al.

[11] 4,145,795
[45] Mar. 27, 1979

[54] QUICK RELEASE HOOK

[75] Inventors: Ian F. Henry; James M. Adamson, both of Aberdeen, Scotland

[73] Assignee: Ashmarine Limited, Aberdeen, Scotland

[21] Appl. No.: 923,634

[22] Filed: Jul. 11, 1978

Related U.S. Application Data

[62] Division of Ser. No. 790,097, Apr. 22, 1977, abandoned.

[51] Int. Cl.² ............................................. A44G 13/00
[52] U.S. Cl. ............................ 24/241 PP; 24/230 AP
[58] Field of Search ................ 24/241 PP, 230 AP; 294/83 R

[56] References Cited

U.S. PATENT DOCUMENTS

| 29,064 | 7/1860 | Davis | 24/241 PP |
| 3,239,266 | 3/1966 | Elliott | 294/83 R |

Primary Examiner—Bernard A. Gelak
Attorney, Agent, or Firm—Kemon & Estabrook

[57] ABSTRACT

A fastening device such as a pelican hook primarily for maritime uses, the device comprising a body with a pivoted lever and a restraining member so arranged that in the closed position the lever lies substantially parallel to the body to form a narrow parallelepipedal space and the bending moment produced on the body from the lever is low.

2 Claims, 7 Drawing Figures

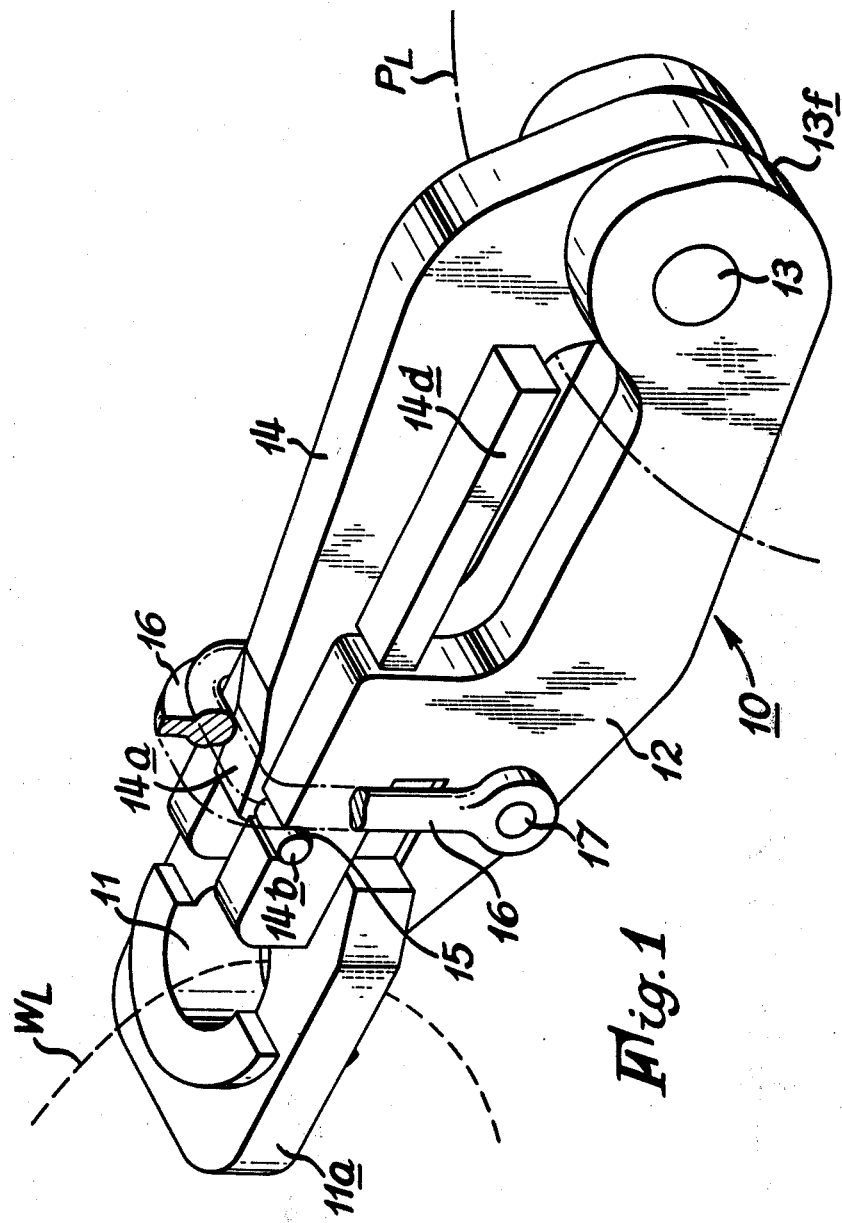

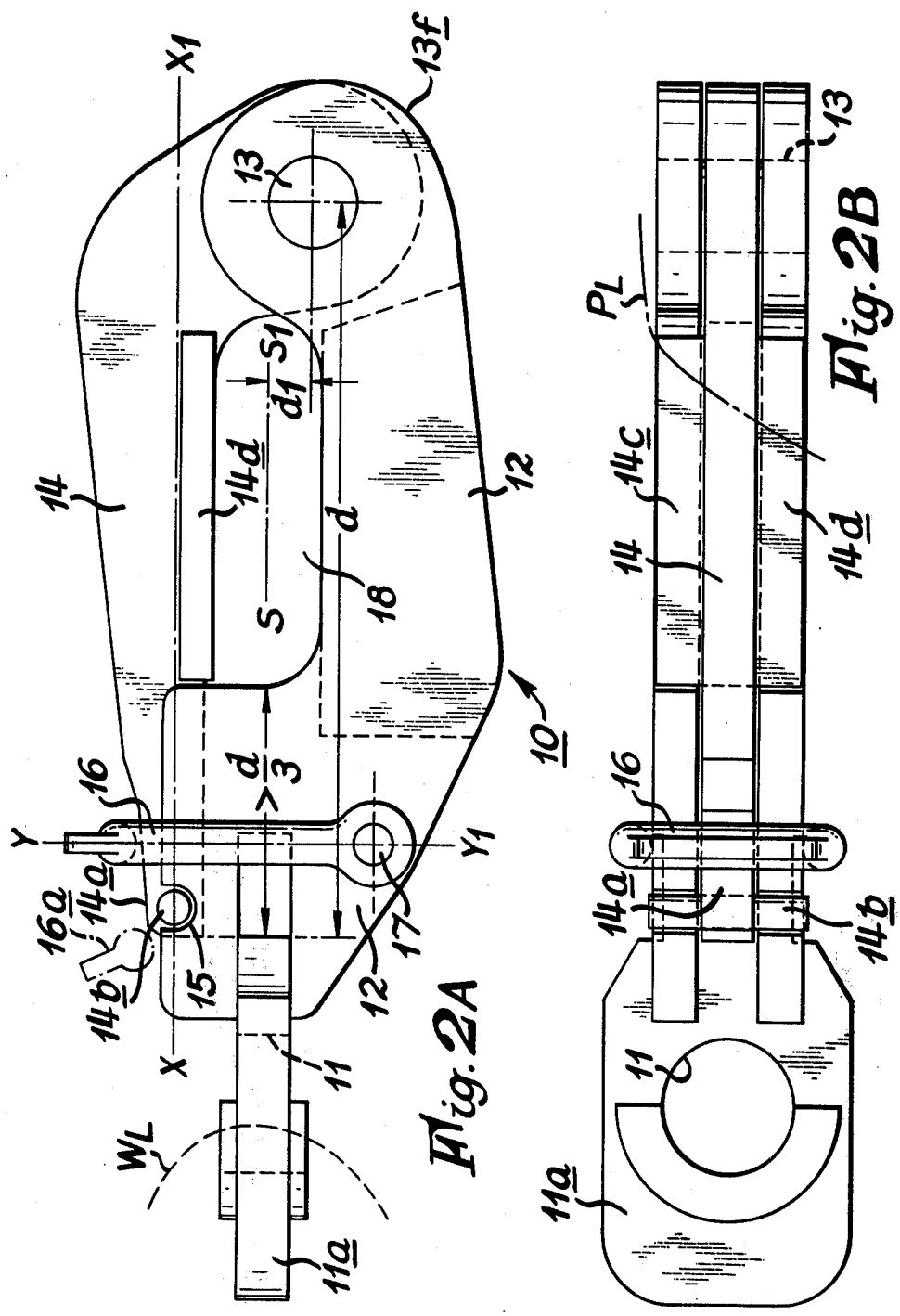

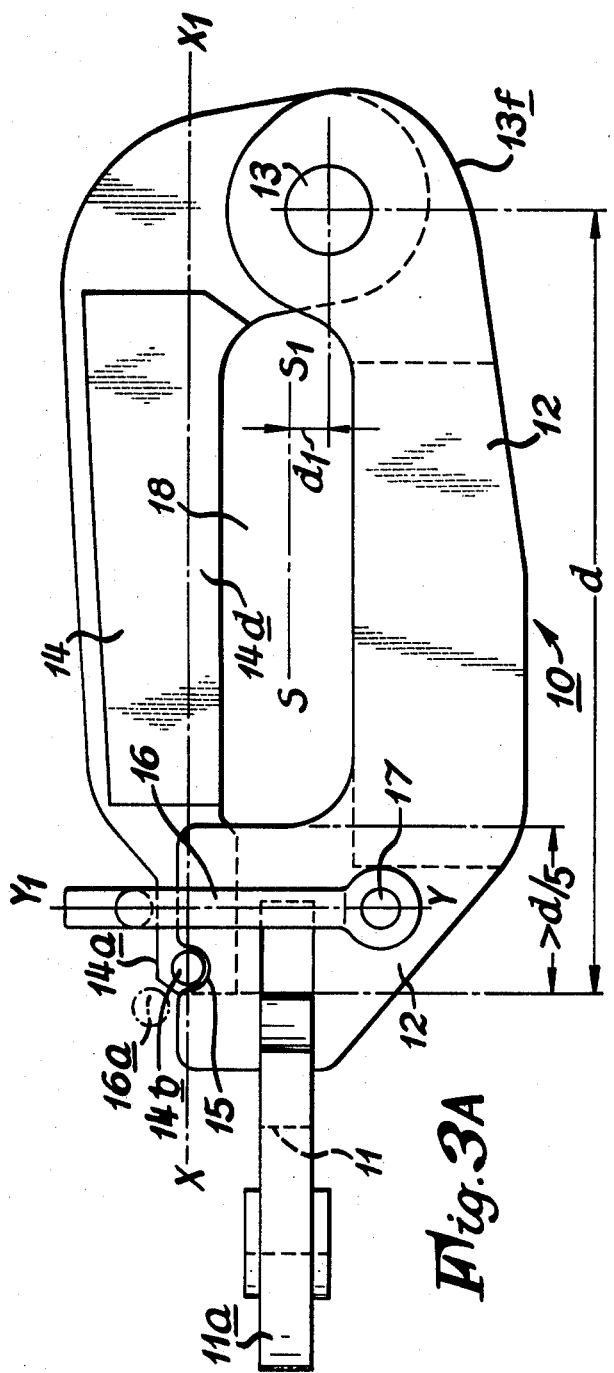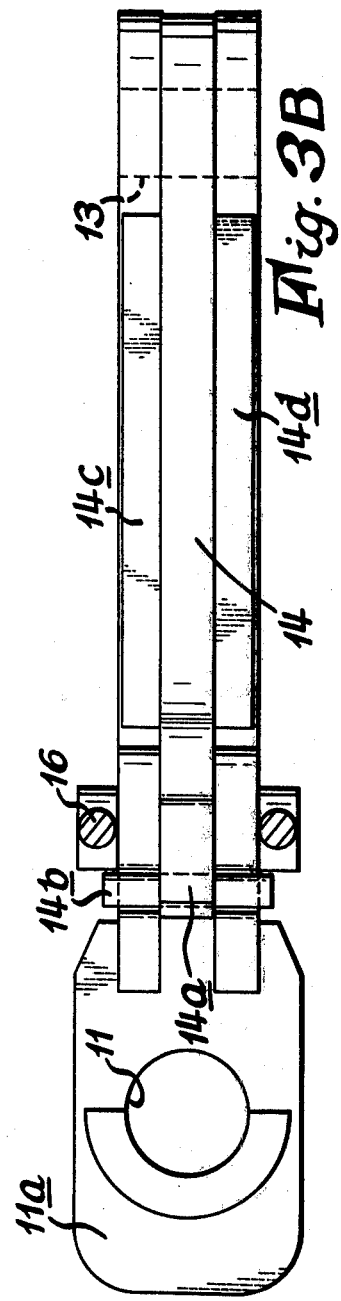

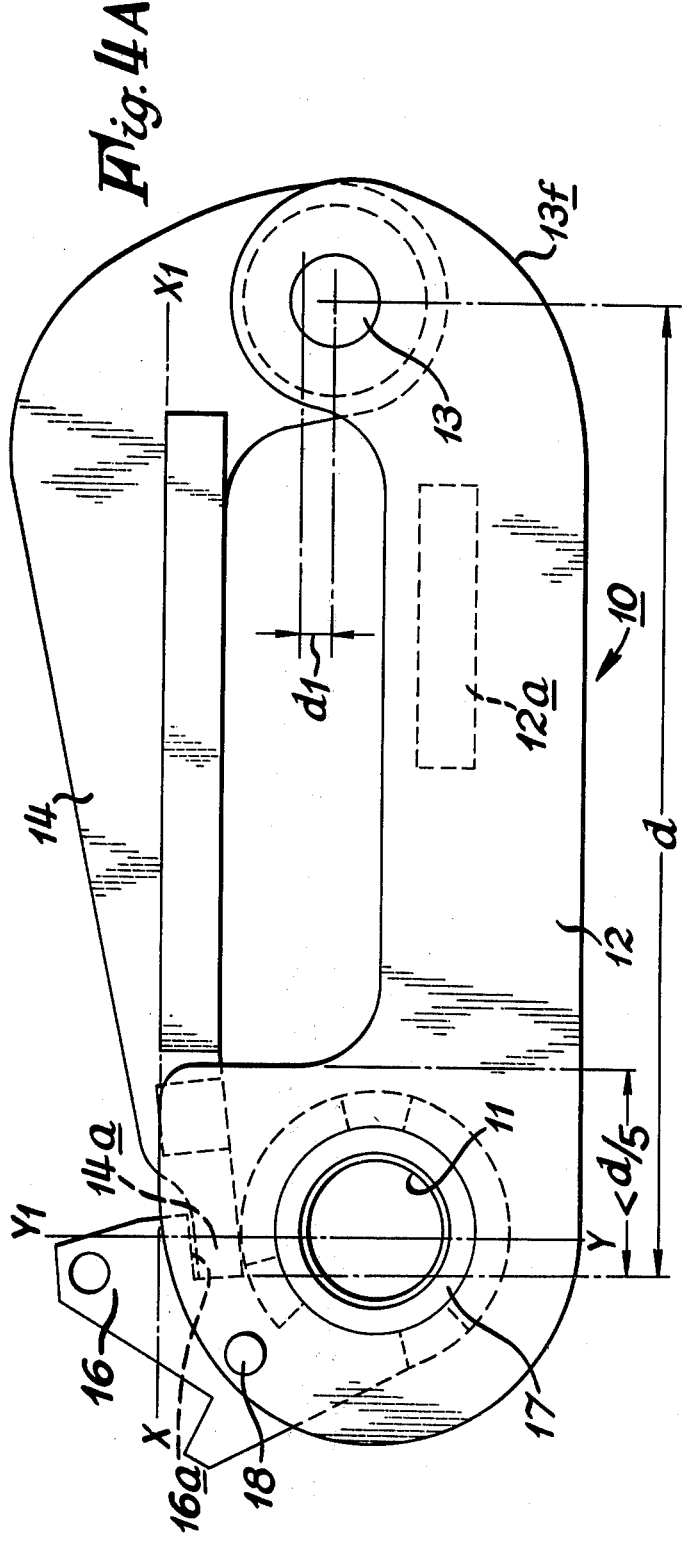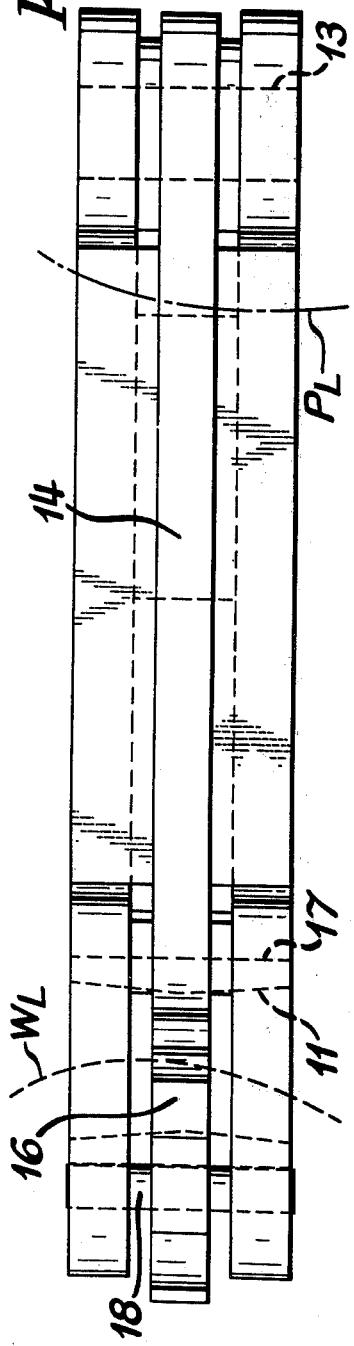

QUICK RELEASE HOOK

This is a division of application Ser. No. 790,097, filed April 22, 1977, now abandoned.

This invention relates to fastening devices and more particularly to a quick release hook such as that known as a pelican hook which hooks generally have a body, a pivoted lever and a pivoted restraining member.

Pelican hooks are usually fixed at one end to a shackle and with the body and the lever open are able to grasp for example a pendant line and then with the body and lever closed by means of the restraining member make the pendant line fast.

If the pendant line is weighted as for example by an anchor, then the weight to be taken by the pelican hook can be large and the forces generated within it also large. Indeed, pelican hooks have been known to burst apart under the load in such maritime uses.

It is known that the forces which causes failure in a pelican hook are predominantly side forces upon the lever.

This advantage is overcome in the present invention by providing a fastening device in the form of a pelican hook in which such side forces on the lever are partly restrained by the body of the hook supporting the lever when closed over a length of said lever at that part of said lever remote from its main pivot such that the bending moments are kept to a low value.

According to the invention we provide a fastening device comprising a body portion having an eyehole, a lever pivoted at one end of said body portion and a restraining member for said lever said restraining member being pivoted toward the other end of said body portion, the lever when closed with said body portion and restrained by said member being supported by said body portion at the end remote from the lever pivot, said lever lying substantially parallel with said body portion to form a narrow space of substantially parallelepipedal form therebetween, the distance normal to a line, centrally placed in said space and substantially parallel to the line of the lever ($XX_1$) and the centre of the pivot of said lever, being small so that any bending moment on the body portion and the pivot that is derived from the lever when the device is in use in kept to a low value.

The support provided by said body to said lever is such that it substantially eliminates pure bending of the pivot of the lever this being achieved by the body giving lateral support to the nose of the lever.

The geometry of the pelican hook is such that the restraining member when holding the lever closed to the body is substantially transverse to the line ($xx_1$) of the lever when closed, and the end of the pelican hook which receives the shackle is in a plane normal to the plane of the opening action of the lever, further the grasping space between the lever and the body when closed is arranged to have a substantially parallelepiped form, said space being provided at that part delimited by the lever with substantial cheek faces to abut with the pendant line.

The invention will be more fully appreciated from the following description by way of example only of two pelican hooks shown in the figures of the accompanying drawing in which:

FIG. 1 is a view in oblique perspective of a pelican hook in the closed condition;

FIGS. $2_A$, $2_B$, $3_A$, $3_B$, $4_A$ and $4_B$ respectively side elevations and plans in first angle orthographic projection of three pelican hooks more clearly to show the geometry of its related parts.

Referring now specifically to FIGS. 1 to $3_B$ inclusive of the drawing, a pelican hook shown generally at 10 is connected to a shackle $W_L$ shown by a dotted line, the pin of said shackle passing through an eyehole 11, which eye is in an eye portion 11a welded to or integral with a body portion 12 having a main pin or pivot 13 to which is pivoted a lever 14. The lever 14 has a nose piece 14a and a closure retaining pin 14b which rests, when the lever 14 and body portion 12 are closed, in a recessed slot 15. The lever 14 is retained in the closed position by a restraining member in the form of a hoop 16 pivoted at 17 in the body portion 12. When the hoop 16 is moved to position 16a the lever 14 is free to open.

The front end of the hook is shown at 13f and this end is the end made to embrace, with the lever 14 and body portion 12 open, a vertical pendant line $P_L$ shown by a chain dotted line so that the pendant line $P_L$ is caught as between two jaws, the lever 14 is then closed with the body portion 12 by means of hoop 16 to trap and hold the pendant line $P_L$. The force on the line $P_L$ with, for example, a heavy anchor attached thereto, is taken by the body portion 12 of the hook 10. The lever 14 has two cheek faces 14c, 14d which give an ample bearing surface to said line $P_L$.

The geometry of the hook is best seen from FIG. $2_A$. When the lever 14 is closed to the body 12 as shown, the line $XX_1$ of the lever is such that the grasping space 18 is of a rectangular shape and parallelepiped form and more than one third ($>d/3$) of the length d of the lever 14 from its end at 14a to the centre of the pivot or main pin 13 is supported by the body 12 of the hook. Further, in the closed position, as shown, the hoop 16 is substantially transverse to the line $XX_1$, that is to say the line $YY_1$ is normal to the line $XX_1$. The distance $d_1$ is made to be small, (generally equal to or less than the radius of the pivot 13), said distance $d_1$ being the distance between the lines $SS_1$ in the centre of the substantially rectangular space 18 and a line parallel to $SS_1$ through the centre of pivot or main pin 13, said distance being measured transverse to $SS_1$.

A hook made in accordance with FIGS. 1, $2_A$ and $2_B$ of total length 26 inches (660 mm) and with a pivot pin 2 inches (50 mm) diameter from a nickel chromium alloy is able to withstand a pull of 250 tonf (2,491,000 N).

Another form of pelican hook within the ambit of the invention is shown in FIGS. $3_A$ and $3_B$ where the same parts are denoted by the same reference numerals. This pelican hook is a heavy duty hook designed for use with chain in which the links are of 3 to 3½ inches (76–89 mm) dia steel and said links may be about 18 inches (5470 mm) long. The distance $d_1$ is made to be small (generally equal to or less than the radius of the pivot 13), said distance $d_1$ being the distance between the lines $SS_1$ in the centre of the substantially rectangular space 18 and a line parallel to $SS_1$ through the centre of pivot or main pin 13, said distance being measured transverse to $SS_1$. The length (d) of the lever supported by the body is in this example only greater than one fifth ($>d/5$). A hook made in accordance with FIGS. $3_A$, $3_B$ of total length 30 inches (762 mm) and with a pivot pin of 2 inches diameter (50 mm) from a nickel chromium alloy is able to withstand a pull of 200 tonf (1,992,800 N).

Another form of pelican hook within the ambit of the invention is shown in FIGS. 4A, 4B where the same or similar parts are denoted by the same reference numerals. A heavy duty pelican hook shown generally at 10 has an eye 11 for a shackle a body portion 12, a main pin or pivot 13 and a lever 14 pivoted thereby. The lever 14 has a nose piece 14a which is able to be received by a detent 16a in a restraining member 16 pivoted at 17 in the body portion 12, which pivot 17 is a ring pivot concentric with eye 11 which receives a shackle $W_L$.

The body 12 is provided with a welded spacer bar shown at 12a and the nose piece 14a of the lever 14 has spacers 14b one on each side of the nose piece and which spacers rest on the two sides of the body 12.

The geometry of this heavy duty hook is in agreement with that described for the hook of FIGS. 2A and 3A. The restraining member 16 when holding the lever 14 closed as shown in FIG. 4A is substantially transverse to the line $XX_1$ of the lever 14 when closed; that is to say $XX_1$ and $YY_1$ are substantially orthogonally disposed one to the other and the grasping space 18 is parallelepiped in form. Further, more than one fifth ($>d/5$) of the length d of the lever 14 is supported by the body 12 when the lever is closed to eliminate pure bending at pivot pin 13.

The lever 14 is locked in the closed position by the insertion of a pin 18 through aligned holes in the body 12 and the restraining member or plate 16.

The hook is preferably made throughout of 1.5 manganese steel (BS 2770).

We claim:

1. A fastening device comprising a body portion having an eyehole constituting a pulling eye for a shackle, a lever, a pin for pivotally mounting one end of said lever to said body portion, a restraining member pivotally mounted at the other end of said body portion in concentric relation to said eyehole, said lever when closed with said body portion and restrained by said member being supported by said body portion at the end remote from the lever pivot, said lever lying substantially parallel with said body portion to form a narrow grasping space of substantially parallelepipedal form therebetween, the distance normal to a line, centrally placed in said space and substantially parallel to the longitudinal axis of said body portion and the center of the pivot of said lever being of the order of the radius of said pin so that any bending moment on the body portion and the pivot that is derived from the lever when the device is in use is kept to a low value.

2. The fastening device as defined in claim 1 wherein the restraining member is a plate with a detent, said plate being pivotable about the body portion.

* * * * *